United States Patent
Kudo (10) Patent No.: US 9,505,274 B2
(45) Date of Patent: Nov. 29, 2016

(54) PNEUMATIC TIRE

(71) Applicant: SUMITOMO RUBBER INDUSTRIES, LTD., Kobe-shi, Hyogo (JP)

(72) Inventor: Daisuke Kudo, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 615 days.

(21) Appl. No.: 13/941,588

(22) Filed: Jul. 15, 2013

(65) Prior Publication Data

US 2014/0041782 A1   Feb. 13, 2014

(30) Foreign Application Priority Data

Aug. 10, 2012   (JP) .................. 2012-178770

(51) Int. Cl.
*B60C 13/00* (2006.01)
*B60C 13/02* (2006.01)

(52) U.S. Cl.
CPC ............. *B60C 13/02* (2013.01); *B60C 13/001* (2013.04)

(58) Field of Classification Search
CPC ...... B60C 13/00; B60C 13/02; B60C 13/023
See application file for complete search history.

(56) References Cited

U.S. PATENT DOCUMENTS

2003/0084979 A1   5/2003  Matsumoto

FOREIGN PATENT DOCUMENTS

| JP | 2003-182317 A | 7/2003 |
| JP | 2003-320818 | * 11/2003 |
| JP | 2009-143488 A | 7/2009 |

* cited by examiner

*Primary Examiner* — Justin Fischer
(74) *Attorney, Agent, or Firm* — Birch, Stewart, Kolasch & Birch, LLP

(57) ABSTRACT

A pneumatic tire comprises a sidewall portion is provided in the outer surface with a circumferentially continuous or discontinuous serrated zone in which radially extending serration ridges are arranged circumferentially of the tire. The serration ridges are grouped into circumferentially successively arranged groups each consisting of serration ridges whose angles $\theta$ with respect to the respective tire radial directions are different from each other, and gradually increased toward one circumferential direction. Each group has an equally-spaced position at which the serration ridges are equally spaced in the tire circumferential direction.

8 Claims, 10 Drawing Sheets

PNEUMATIC TIRE

BACKGROUND OF THE INVENTION

The present invention relates to a pneumatic tire more particularly to a structure of a sidewall portion of the tire capable of hiding bulges or dents occurred in the outer surface of the sidewall portion and deteriorating the appearance of the tire.

Usually, a pneumatic tire is manufactured by wrapping or winding various components such as strips of rubber and strips of rubberized reinforcing cords.

In recent years, on the other hand, there is a trend toward light weight tires from the aspect of low-fuel consumption and resource saving. Therefore, the thickness of the sidewall rubber covering the carcass ply cords becomes reduced when compared to before. As a result, in the outer surface of the vulcanized tire, especially, the outer surface of the tire sidewall portion, bulges or dents due to a turnup portion of a carcass ply, an overlap joint between circumferential ends of a wound strip and the like are more noticeable. Thus, there is a problem with the external appearance of the tire.

Figure 11:
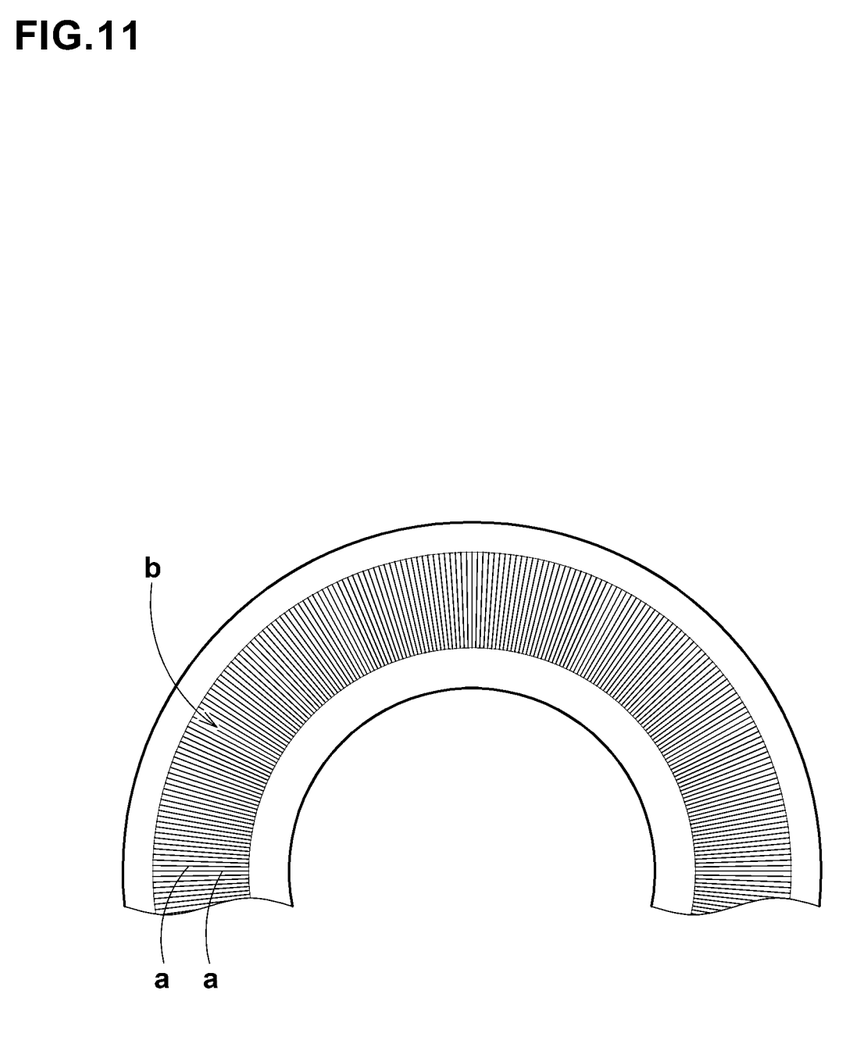
FIG. 11 shows a serrated zone of the prior art.

In Japanese Patent Application Publication Nos. JP-A-2009-143488 and JP-A-2003-182317, there is disclosed a tire sidewall portion provided in the outer surface with a serrated zone (b) formed by a large number of serration ridges (a) which are arranged circumferentially of the tire at regular intervals so that the serration ridges (a) extend radially at a constant angle with respect the radial direction as shown in FIG. 11. (in FIG. 11, the angle is zero) Taking a partial view of such a serrated zone (b), the serration ridges (a) are parallel each other.

If a bulge or dent is occurred in such a serrated zone (b), the selection pattern which is originally uniform, is disturbed. Therefore, the existence of the bulge or dent becomes rather remarkable contrary to expectations.

SUMMARY OF THE INVENTION

It is therefore, an object of the present invention to provide a pneumatic tire in which, even if a bulge or dent occurs in a sidewall portion, it is possible to hide it or make it indistinct, and thereby the external appearance of the tire can be improved.

According to the present invention, a pneumatic tire comprises a tread portion, a pair of axially spaced bead portions, and a pair of sidewall portions extending between the tread edges and the bead portions, wherein the outer surface of the sidewall portion is provided with a circumferentially continuous or discontinuous serrated zone in which radially extending serration ridges are arranged circumferentially of the tire, the serration ridges of the or each serrated zone are grouped into circumferentially successively arranged groups each consisting of serration ridges whose angles θ with respect to the respective tire radial directions are different from each other and gradually increased toward one circumferential direction, and each of the groups has an equally-spaced position which is a radial position between the radially outer end and radially inner end of the group and at which the serration ridges are equally spaced in the tire circumferential direction.

The pneumatic tire according to the present invention may be provided with the following features (1)-(4):

(1) the equally-spaced position is radially outside the intermediate position between the radially outer end and radially inner end of the group in the radial direction;

(2) the number of the serration ridges in each of the groups is 3 to 10;

(3) the groups include groups whose equally-spaced positions are different from each other;

(4) the groups include groups whose numbers of serration ridges are different from each other.

DESCRIPTION OF THE PREFERRED EMBODIMENTS

Embodiments of present invention will now be described in detail in conjunction with accompanying drawings.

In the drawings, pneumatic tire 1 according to the present invention comprises a tread portion, a pair of axially spaced bead portions, a pair of sidewall portions 2 extending between the tread edges and the bead portions.

At least one of the sidewall portions 2 is provided in the outer surface 2S thereof with a circumferentially continuously or discontinuously extending serrated zone 3.

In this example, the serrated zone 3 is formed as a circumferentially continuously extending circular zone.

In the case of the circumferentially discontinuous serrated zone 3, one or more serrated zones 3 are arranged around the tire rotational axis.

The or each serrated zone 3 is defined by a large number of serration ridges 4 arranged circumferentially of the tire at intervals.

Figure 2:
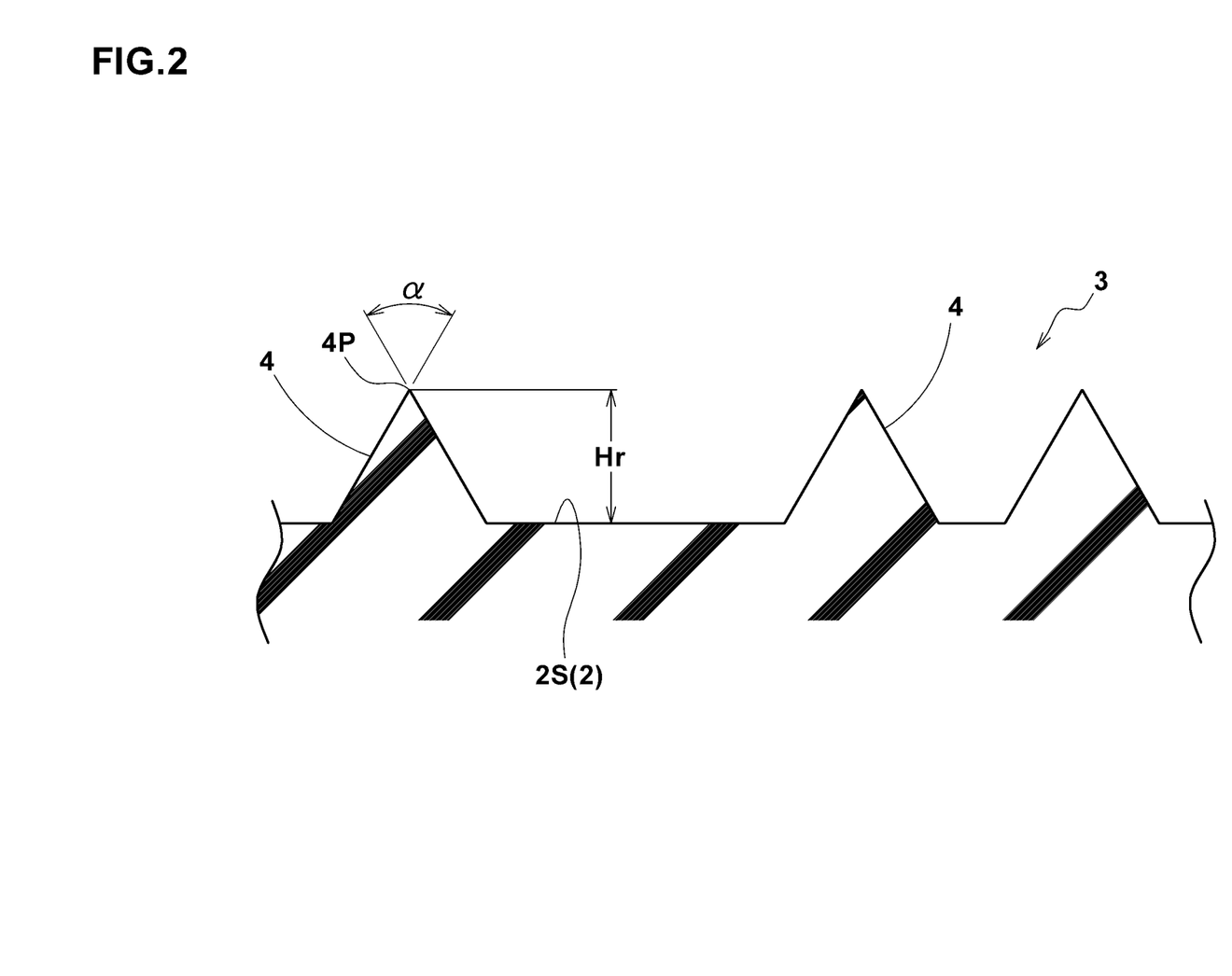
FIG. 2 is an enlarged cross sectional view of a part of a serrated zone showing a cross-sectional shape of the serration ridge.

In this example, as shown in FIG. 2, the serration ridges 4 are formed by small ribs protruding from the outer surface 2S of the sidewall portion 2.

As another example, the serration ridges 4 can be formed by forming grooves in the outer surface 2S of the sidewall portion 2. Thus, the serration ridges 4 are ribs protruding from the groove bottoms, and the vertices of the serration ridges 4 are the same level as the outer surface 2S of the sidewall portion 2.

In any case, the serration ridges 4 have a protruding height Hr of from 0.2 to 0.6 mm. All the serration ridges 4 have identical cross-sectional shapes. As to the cross-sectional shape, an isosceles triangle whose vertex angle α is an acute angle about 40 to 80 degrees is preferably used. Another shape. e.g. inequilateral triangle, trapezoid and the like may be preferably used too.

In the FIGS. 1, 3, 4, 6 to 10, only the ridge lines 4P are shown for the serration ridges 4.

Figure 3:
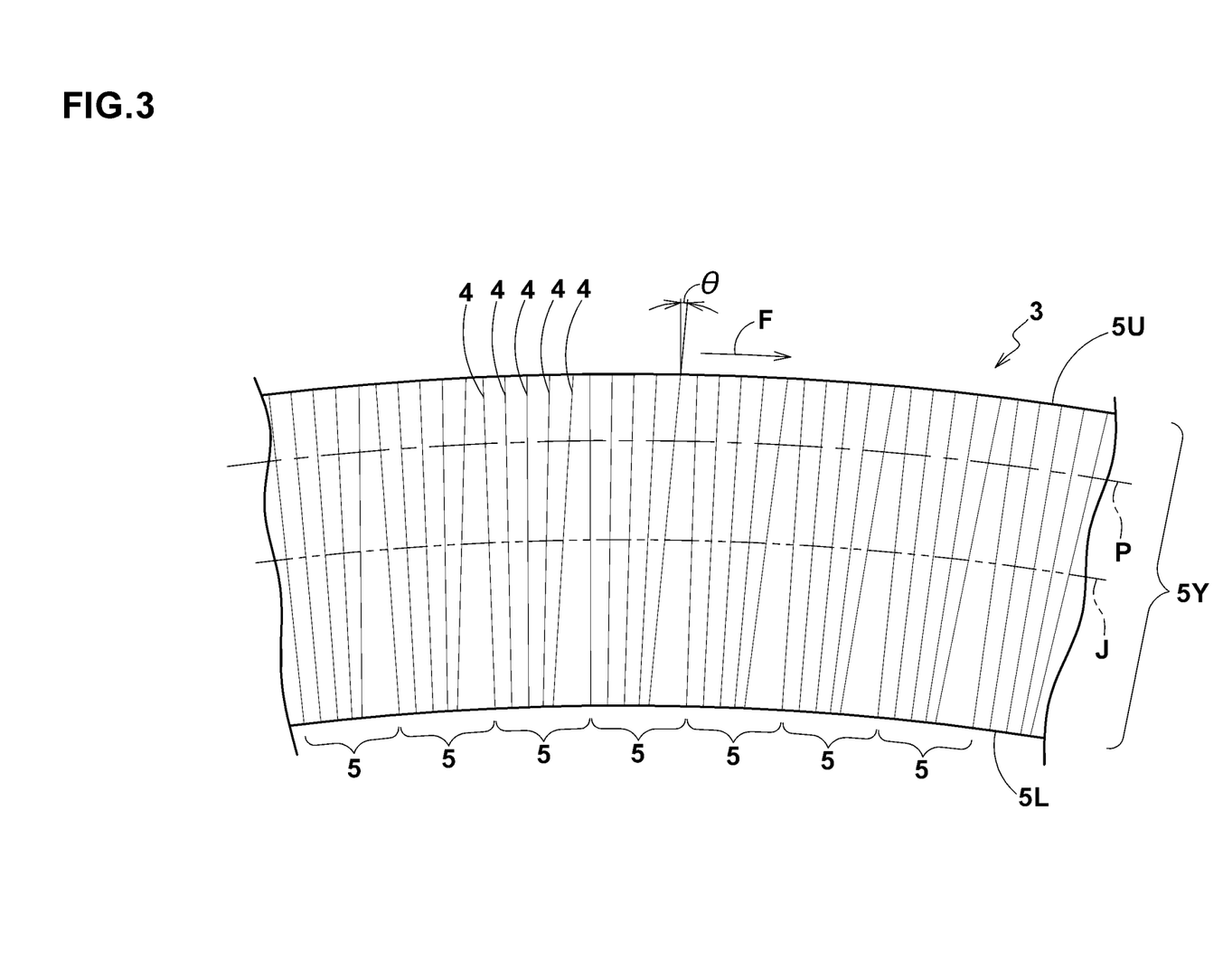
FIG. 3 is a cross sectional view of a part of a serrated zone.
Figure 4:
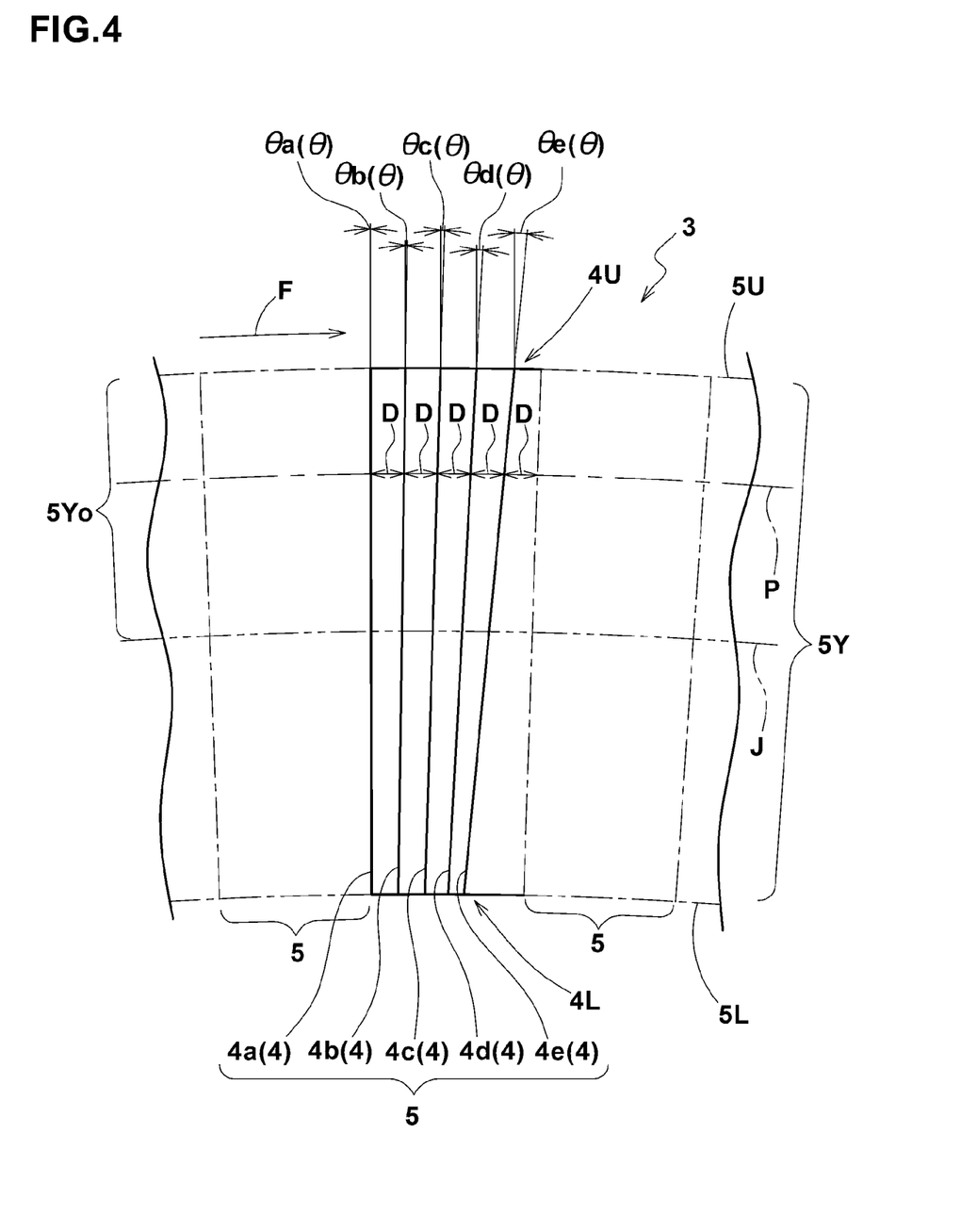
FIG. 4 shows an arrangement of the serration ridges in a group.

In the or each serrated zone 3, as exaggeratingly shown in FIGS. 3 and 4, circumferentially successively arranged groups 5 of serration ridges are recognizable. In other words, the serrated zone 3 is made up of circumferentially successively arranged groups 5.

Each of the groups 5 consists of a plurality of serration ridges 4 whose angles θ with respect to the respective tire radial directions are different from each other and gradually increased toward one circumferential direction F.

The radially outer ends 4U of all the serration ridges 4 in each group 5 are located at the radially outer end 5U of the group 5 (or the whole of the ridges therein), and the radially inner ends 4L of all the serration ridges 4 in each group 5 are located at the radially inner end 5L of the group 5.

For example, each group 5 consists of a first serration ridge 4a with an angle θa, a second serration ridge 4b with an angle θb, a third serration ridge 4c with an angle θc, a fourth serration ridge 4d with an angle θd and a fifth serration ridge 4e with an angle θe (θa=θmin<θb<θc<θd<θe=θmax) which are arranged in this order toward one circumferential direction F (in FIGS. 3 and 4, from left to right).

In each of the groups 5, the minimum θmin of the angle θ is preferably not more than 6 degrees, most preferably 0 degree. Preferably, the difference (θmax−θmin) between the maximum θmax and minimum θmin of the angle 0 is set in a range of not less than 1.5 degrees, but not more than 6.0 degrees.

To be exact, the value of the angle θ refers to the measurement at the radially outer end 4U of the serration ridge 4.

Figure 5:
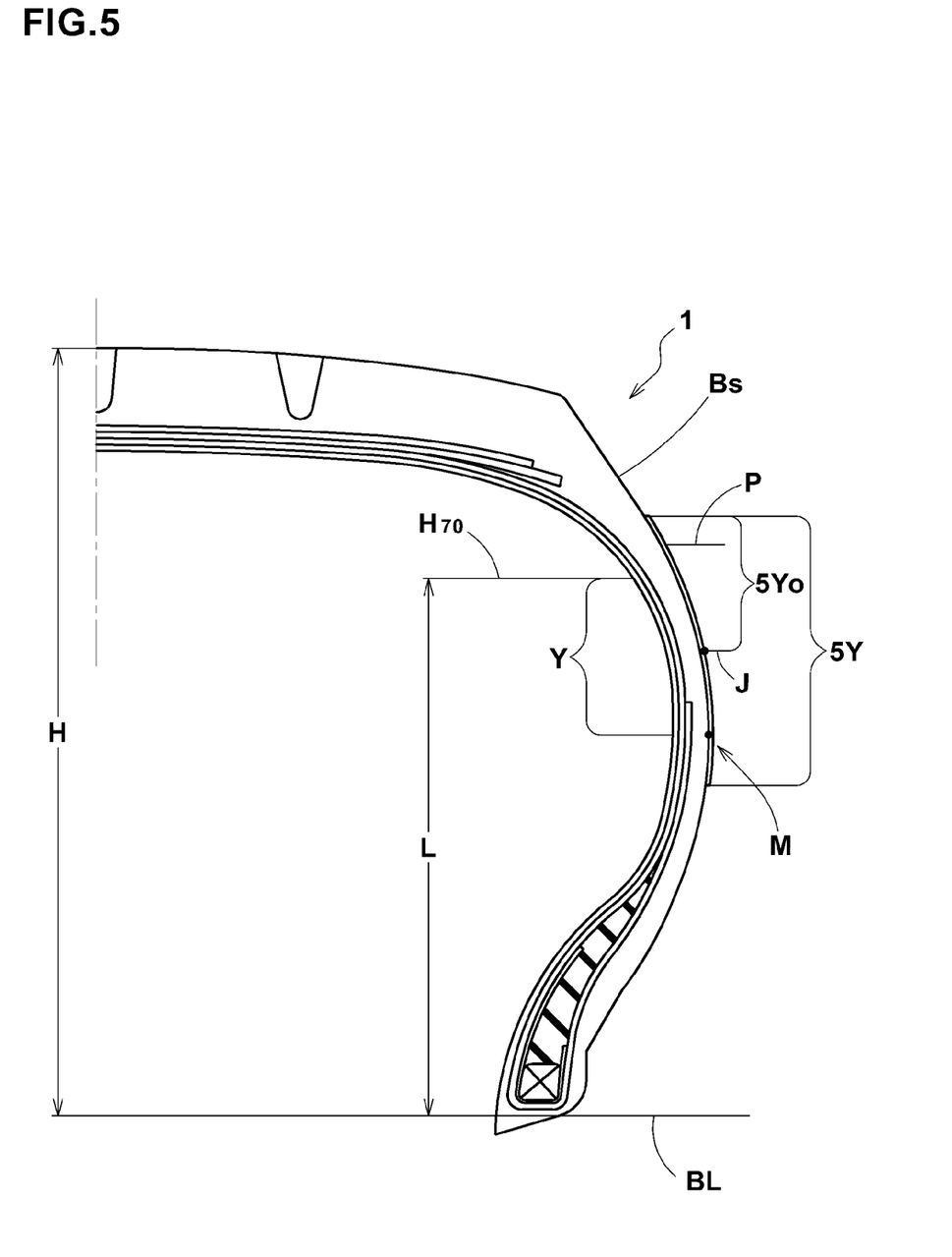
FIG. 5 is a cross sectional view of a tire for explaining the position of the serrated zone.

It is preferable that, as shown in FIG. 5, the serrated zone 3 extends at least between the maximum tire section width position M and a position H70 at a height L of 70% of the tire section height H from the bead base line BL. (at least range Y in FIG. 5)

The center J of the radial extent 5Y in the tire radial direction is positioned radially outside the maximum tire section width position M.

Each of the groups 5 has an equally-spaced position P in its radial extent 5Y between the radially outer end 5U and the radially inner end 5L of the group 5.

The equally-spaced position P is a radial position on a circle concentric with the tire rotational axis.

At the equally-spaced position P, the serration ridges 4 are equally-spaced in the tire circumferential direction.

The equally-spaced position P is SET TO BE radially outside the above-mentioned center J. Preferably, the equally-spaced position P of the group 5 is at the radially outer end 5U of the group 5.

The number n of the serration ridges 4 in each of the groups 5 is preferably set in a range of not less than 3, but not more than 10, more preferably not more than 5.

Measured at the equally-spaced position P, the angularly pitches D of the serration ridges 4 around the tire rotational axis are preferably set in a range of not more than 0.6 degrees, but not less than 0.25 degrees. The product (n×D) of the number n of the serration ridges 4 and the pitch D is preferably set in a range from 1 to 6 degrees.

In the serrated zone 3, as the angles of the serration ridges 4 and the spacing between the serration ridges 4 are varied, the serration pattern of the serrated zone 3 becomes non-uniform. If a small area of the serrated zone 3 is viewed along the circumferential direction, the hue of the small area changes. Further, as the equally-spaced position P exists in the radial extent 5Y, the hue also changes in the radial direction. As a result, even if the serrated zone 3 is undulated by bulge or dent and the hue is changed, since the hue is already changed, the existence of the bulge or dent becomes hard to be recognized.

Since the equally-spaced position P is defined on the radially outside of the center J, the serration pattern becomes more nonuniform on the maximum tire section width position M side where the bulge or dent tends to become larger, therefore, the function to make a bulge or dent indistinct becomes more effectual.

The area Bs on the radially outside of the equally-spaced position P is close to the tread or road surface and liable to soiled. In such area, the serration pattern becomes relatively uniform. As a result, adhesion of dirt is inhibited or dirt easily unsticks.

If the angle difference (θmax−θmin) is less than 1.5 degrees, it becomes difficult to make the bulge or dent indistinct.

If the angle difference (θmax−θmin) is more than 6.0 degrees or the number n of the serration ridges 4 is less than 3, there is a possibility that the space between the serration ridges 4 increases and thereby the external appearance is deteriorated.

Figure 6:
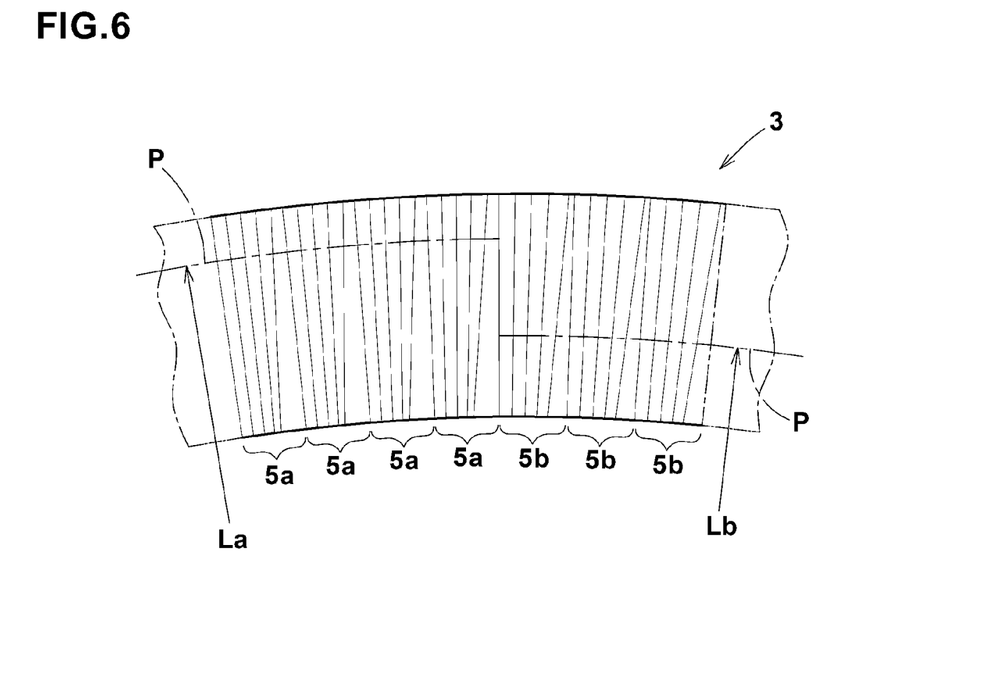
FIG. 6 and FIG. 7 each shows another example of the serrated zone.

FIG. 6 shows another example of the serrated zone 3. In this example, the groups 5 in the serrated zone 3 include groups 5 whose equally-spaced positions P are different from each other. In FIG. 6, the serrated zone 3 includes groups 5a whose equally-spaced positions P are at a radial distance La and groups 5b whose equally-spaced positions P are at a radial distance Lb, each from the bead base line BL. (La>Lb)

The groups 5a and groups 5b are alternately arranged in the tire circumferential direction.

Therefore, the change in the hue is increased in the tire radial direction and in the tire circumferential direction, and the function to make a bulge or dent indistinct can be improved.

Figure 7:
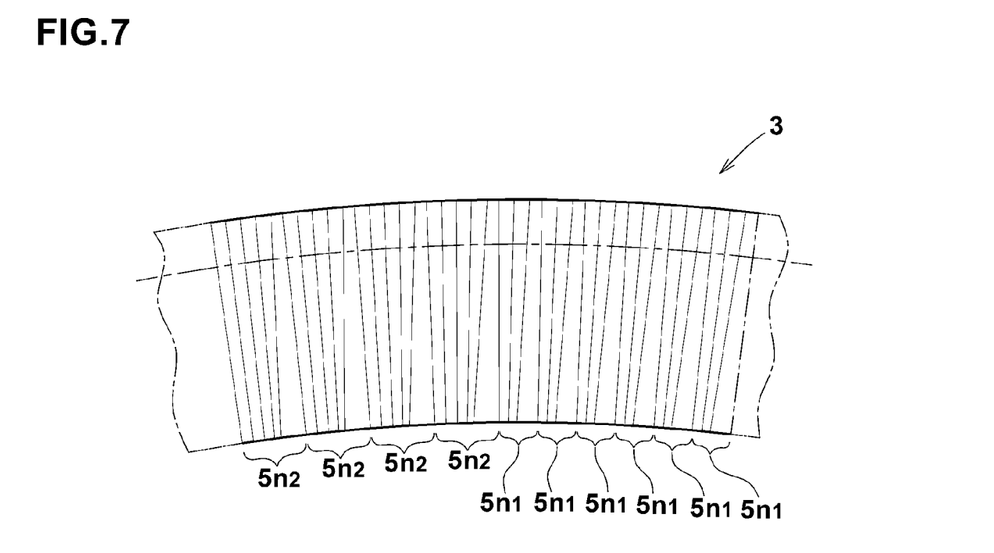
Figure 8A:
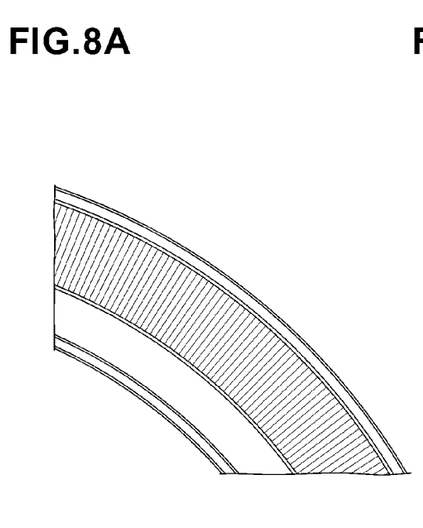
FIGS. 8A-8D, 9A-9D and 10A-10B show serrated zones used in the undermentioned comparison test.
Figure 8B:
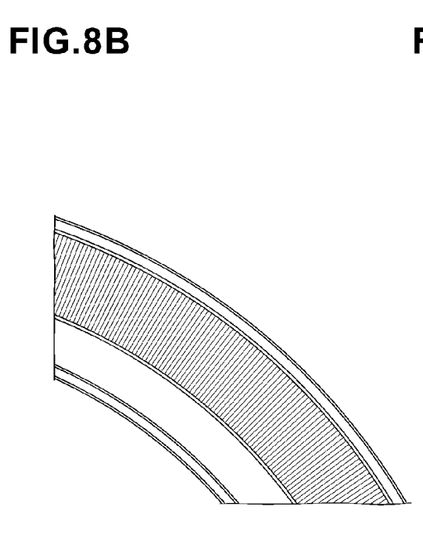
Figure 8C:
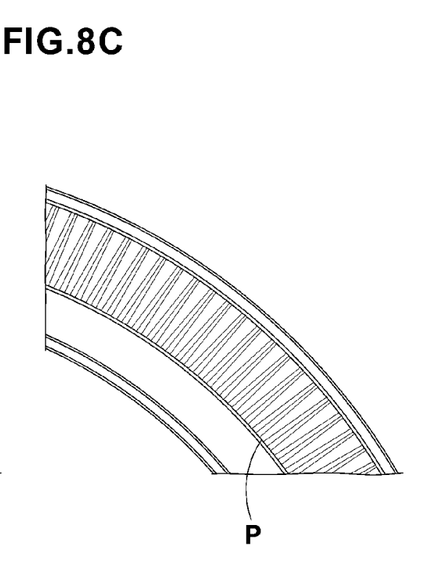
Figure 8D:
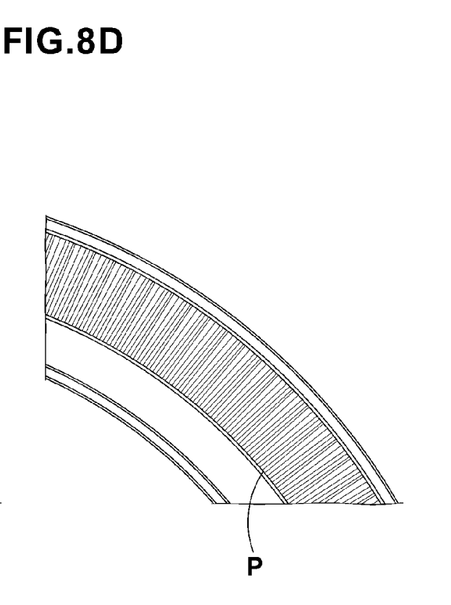
Figure 9A:
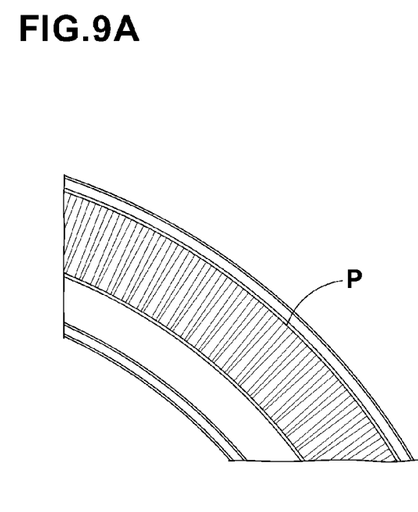
Figure 9B:
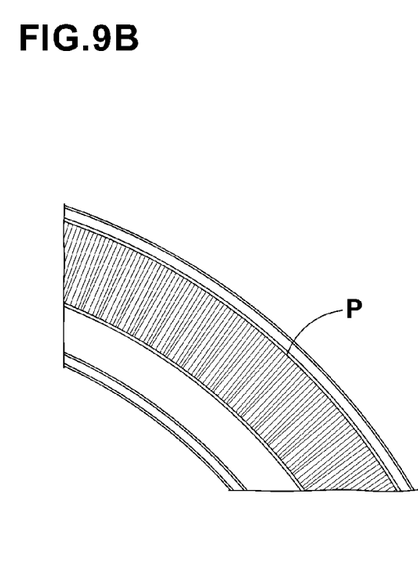
Figure 9C:
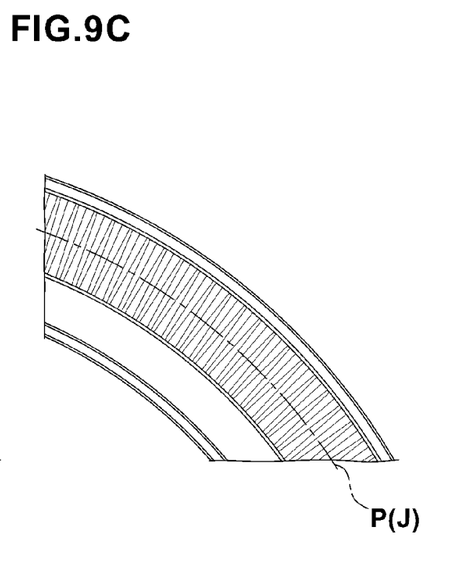
Figure 9D:
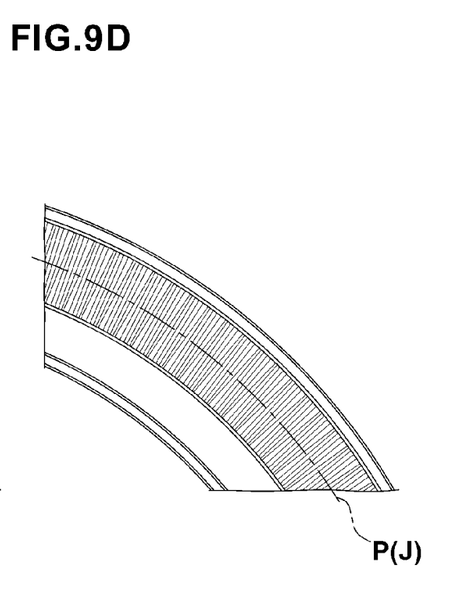
Figure 10A:
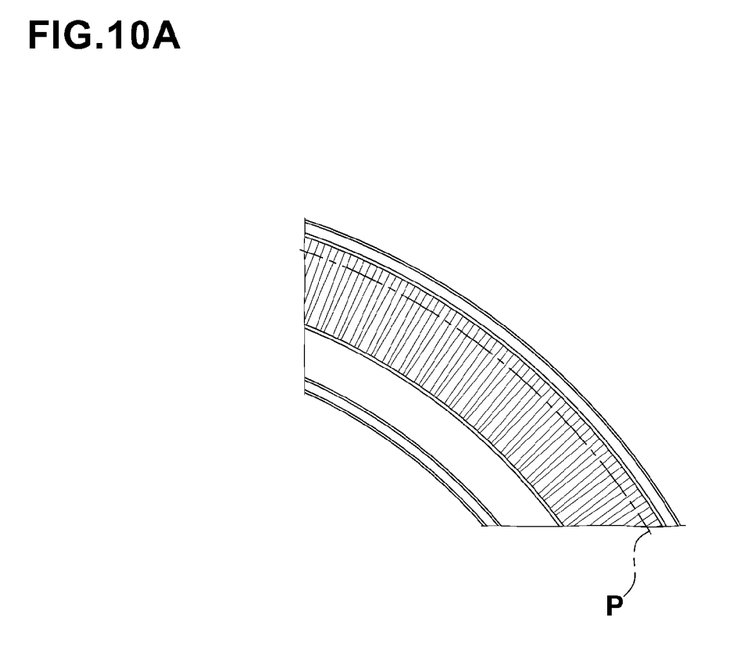
Figure 10B:
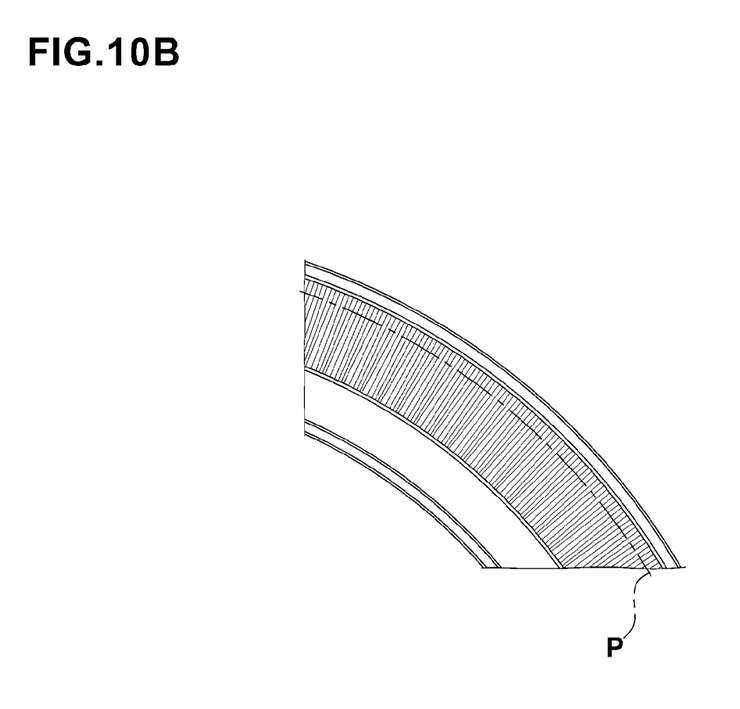

FIG. 7 shows another example of the serrated zone 3. In this example, the groups 5 in the serrated zone 3 include groups 5 whose numbers of serration ridges are different from each other. In FIG. 7, the serrated zone 3 includes groups 5n1 whose number n is 3 and groups 5n2 whose number n is 5. The groups 5n1 and groups 5n2 are alternately arranged in the tire circumferential direction. Therefore, the change in the hue is increased in the tire circumferential direction, and the function is improved.

Figure 1:
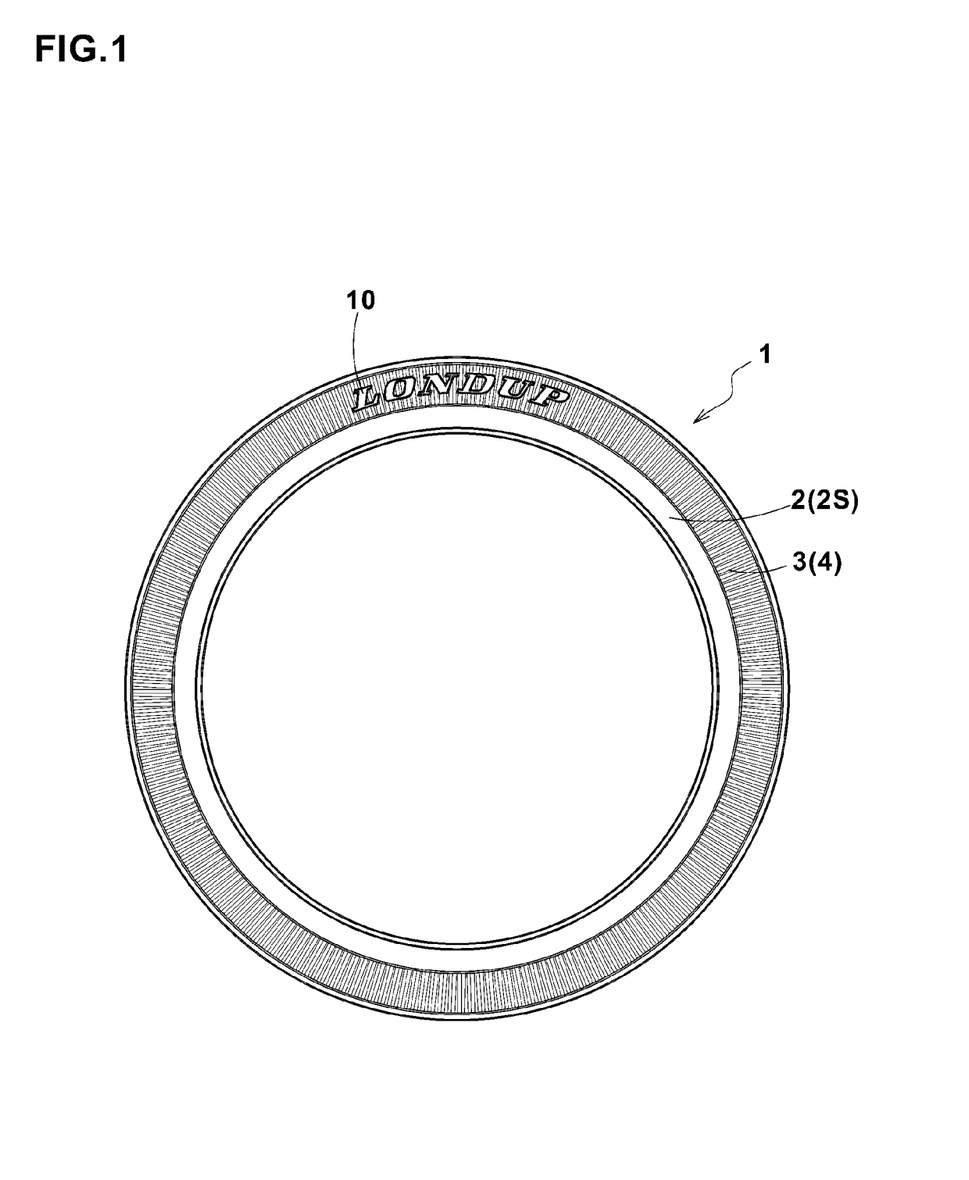
FIG. 1 is a side view of a pneumatic tire as an embodiment of the present invention.

As shown in FIG. 1, the serrated zone 3 may be provided with marks 10 such as characters and diagrams.

Comparison Tests

Pneumatic tires (size 185/60R15) each having a circumferentially continuously extending serrated zone were manufactured experimentally. Specifications of the serrated zones are shown in Table 1. All of the serration ridges had the same cross-sectional shape, an isosceles triangle with the vertex angle α being 60 degrees and the height (=ridges height Hr) being 0.4 mm.

The tire inflated to a normal pressure 230 kPa was observed from various angles under clear sky, and the appearance of the sidewall portion was evaluated into five ranks. The results are shown in Table 1 wherein the higher the rank number, the better the appearance.

TABLE 1

| Tire | Ref. 1 | Ref. 2 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| serration (FIG. No.) | 8A | 8B | 8C | 8D | 9A | 9B | 9C | 9D | 10A | 10B |
| serration ridges in each group | | | | | | | | | | |
| number n | 1 | 1 | 3 | 5 | 3 | 5 | 3 | 5 | 3 | 5 |
| angle θmin (deg.) | 0 | 0 | 0 | 0 | 0 | 0 | 0 | 0 | 0 | 0 |
| angle θmax (deg.) | 0.0 | 0.0 | 3.0 | 2.3 | 3.0 | 2.3 | 5.2 | 3.9 | 4.1 | 3.1 |
| equally-spaced positions *1 | — | — | IE | IE | OE | OE | CT | CT | OM | OM |
| pitches D (deg.) | 0.6 | 0.4 | 0.6 | 0.4 | 0.6 | 0.4 | 0.6 | 0.4 | 0.6 | 0.4 |
| appearance | 2.5 | 3 | 3.5 | 4 | 4.5 | 5 | 4 | 4.5 | 4.3 | 4.8 |

*1 IE: inner end of radial extent  OE: outer end of radial extent  CT: center of radial extent  OM: middle between outer end and center of radial extent

The invention claimed is:

1. A pneumatic tire which comprises a tread portion, a pair of axially spaced bead portions, and a pair of sidewall portions extending between the tread edges and the bead portions,
wherein
the outer surface of the sidewall portion is provided with a circumferentially continuous or discontinuous serrated zone in which radially extending serration ridges are arranged circumferentially of the tire,
the serration ridges of the serrated zone or the serrated ridges of each serrated zone are grouped into circumferentially successively arranged groups each consisting of 3 to 10 serration ridges whose angles θ with respect to the respective tire radial directions are different from each other and gradually increased toward one circumferential direction, wherein, given that a first group is one of said groups and a second group is one of said groups that is adjacent to said first group in the circumferential direction toward which the angles θ of the serration ridges of the first group are gradually increased, the angle θ of the serration ridge which is in the second group and closest to the first group is smaller than the angle θ of the serration ridge which is in the first group and closest to the second group, and
each of the groups has an equally-spaced position which is a radial position between the radially outer end and radially inner end of the group and at which the serration ridges are equally spaced in the tire circumferential direction.

2. The pneumatic tire according to claim 1, wherein in each said group, the equally-spaced position is radially outside the intermediate position between the radially outer end and radially inner end of the group in the radial direction.

3. The pneumatic tire according to claim 2, wherein the groups include groups whose equally-spaced positions are different from each other.

4. The pneumatic tire according to claim 2, wherein the groups include groups whose numbers of serration ridges are different from each other.

5. The pneumatic tire according to claim 2, wherein the equally-spaced positions of all groups are the same.

6. The pneumatic tire according to claim 1, wherein in the or each serrated zone, the groups include groups whose equally-spaced positions are different from each other.

7. The pneumatic tire according to claim 6, wherein the groups include groups whose numbers of serration ridges are different from each other.

8. The pneumatic tire according to claim 1, wherein in the or each serrated zone, the groups include groups whose numbers of serration ridges are different from each other.

* * * * *